(12) United States Patent
Takeuchi et al.

(10) Patent No.: US 9,792,274 B2
(45) Date of Patent: Oct. 17, 2017

(54) CATEGORIZING KEYWORDS (71) Applicant: International Business Machines Corporation, Armonk, NY (US)

(72) Inventors: Emiko Takeuchi, Tokyo (JP); Daisuke Takuma, Tokyo (JP); Hirobumi Toyoshima, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 14/609,474

(22) Filed: Jan. 30, 2015

(65) Prior Publication Data
US 2015/0227620 A1 Aug. 13, 2015

(30) Foreign Application Priority Data

Feb. 12, 2014 (JP) ................................. 2014-024512

(51) Int. Cl.
G06F 7/00 (2006.01)
G06F 17/27 (2006.01)
G06F 17/30 (2006.01)

(52) U.S. Cl.
CPC .... G06F 17/2735 (2013.01); G06F 17/30038 (2013.01)

(58) Field of Classification Search
CPC .................................................. G06F 17/30038
See application file for complete search history.

(56) References Cited

U.S. PATENT DOCUMENTS

2008/0294624 A1* 11/2008 Kanigsberg ....... G06F 17/30867

FOREIGN PATENT DOCUMENTS

| JP | 11110409 A | 4/1999 |
|----|----|----|
| JP | 2001022761 A | 1/2001 |
| JP | 2002041544 A | 2/2002 |
| JP | 2005267397 A | 9/2005 |
| JP | 2007087070 A | 4/2007 |
| JP | 2008065523 A | 3/2008 |

(Continued)

OTHER PUBLICATIONS

Pending Application No. 2014-024512, entitled: "Information Processing Device, Method, and Program," filed on Feb. 12, 2014.

*Primary Examiner* — Ajith Jacob
(74) *Attorney, Agent, or Firm* — Stosch Sabo (57) ABSTRACT A keyword to be categorized is received. A category dictionary including categories having associated registered keywords, and a text corpus are received. Registered keywords are identified in the category dictionary having a degree of similarity to the keyword to be categorized that is equal to or greater than a predetermined value, and the categories associated with the identified registered keywords are extracted. Registered keywords are identified that are co-occurring in the text corpus with the keyword to be categorized, and the categories associated with the identified co-occurring registered keywords are extracted. A degree of importance is determined for each extracted category based on a function of the identified registered keywords in the category dictionary and/or a function of the identified co-occurring registered keywords. The extracted categories are outputted, with at least an indication of each category's relative importance, as category candidates for categorizing the keyword to be categorized.

13 Claims, 9 Drawing Sheets

(56) References Cited

FOREIGN PATENT DOCUMENTS

| | | | |
|---|---|---|---|
| JP | 2008257732 | A | 10/2008 |
| JP | 2009015495 | A | 1/2009 |
| JP | 2009223547 | A | 10/2009 |
| JP | 2010198246 | A | 9/2010 |
| JP | 2011118872 | A | 6/2011 |
| JP | 2012198710 | A | 10/2012 |
| JP | 2013105210 | A | 5/2013 |

* cited by examiner

FIG. 1

| Category | Registered Keywords |
|---|---|
| Diseases | Facial nerve paralysis, Bell's palsy, Hunt's syndrome, left-sided hemiplegia, facial paralysis, idiopathic facial |
| Adult Diseases | Gastric cancer, diabetes, heart failure… |
| Paralyses | Left-sided hemiplegia… |
| Facial Nerve Paralyses | Facial nerve paralysis, Bell's palsy, Hunt's syndrome, facial paralysis, idiopathic facial paralysis… |
| Malignant | … |

| Texts |
|---|
| Left-sided hemiplegia... facial nerve paralysis and... |
| ...of left-sided hemiplegia... of Bell's palsy... |
| Hunt's syndrome... left-sided facial paralysis... |
| Malignant tumors... |
| ... |

| Search Category / Keyword | Facial nerve paralysis | Co-Occurrence ||| Edit Distance ||
|---|---|---|---|---|---|---|
| | | Bell's palsy | Hunt's syndrome | | Left-sided paralysis | Facial paralysis |
| ☑ Diseases | ○ | ○ | | | | |
| ☐ Adult Diseases | | | | | | |
| ☐ Paralyses | | | | | ○ | ○ |
| ☑ Facial Nerve Paralyses | ○ | ○ | ○ | | ○ | ○ |
| ☐ Malignant Tumors | | | | | | |

| | | |
|---|---|---|
| Texts | TX1 | Insulin... diabetes and... |
| | TX2 | ... of diabetes... of insulin... |
| | TX3 | Gastric cancer... insulin and... |
| | TX4 | ... of gastric cancer... |
| | TX5 | ... |

| Search Method | Co-Occurrence | | | Edit Distance | | Common Substrings |
|---|---|---|---|---|---|---|
| Category/Keyword | Facial nerve paralysis | Bell's palsy | Hunt's syndrome | Left-sided paralysis | Facial paralysis | Idiopathic left-sided facial paralysis |
| ☑ Diseases | ○ | ○ | ○ | ○ | ○ | ○ |
| ☐ Adult Diseases | | | | | | |
| ☐ Paralyses | | | ○ | | | |
| ☑ Facial Nerve Paralysis | ○ | ○ | | ○ | ○ | ○ |
| ☐ Malignant Tumors | | | | | | |

*Fig. 7*

| Search Method | Co-Occurrence | | | Edit Distance | | Common Substrings |
|---|---|---|---|---|---|---|
| Category/Keyword | Facial nerve paralysis | Bell's palsy | Hunt's syndrome | Left-sided paralysis | Facial paralysis | Idiopathic left-sided facial paralysis |
| ☑ Diseases | ○ | ○ | ○ | ○ | ○ | ○ |
| ☐ Adult Diseases | | | ○ | | | |
| ☐ Paralyses | | | | ○ | | |
| ☑ Facial Nerve Paralyses | ○ | ○ | | | ○ | ○ |
| ☐ Malignant Tumors | | | | | | |

CATEGORIZING KEYWORDS

BACKGROUND

The present invention relates to an information processing device, method, and program.

In these technologies, a keyword search is performed by either searching for keywords co-occurring with a keyword to be categorized, searching for keywords based on degree of similarity using a vector of the keyword to be categorized or a training feature vector, searching for keywords using a morphological analysis, or searching for keywords using synonyms, and then extracting categories using the retrieved keywords. It may be advantageous to improve the extraction accuracy for the categories to be used in the classification process.

SUMMARY

Embodiments of the present invention disclose a method, computer program product, and system for categorizing keywords. A keyword to be categorized is received. A category dictionary including categories having associated respective pluralities of registered keywords, and a text corpus are received. One or more registered keywords are identified in the category dictionary having a degree of similarity to the keyword to be categorized that is equal to or greater than a predetermined value, and the categories associated with the identified registered keywords are extracted. One or more registered keywords are identified that are co-occurring in the text corpus with the keyword to be categorized, and the categories associated with the identified co-occurring registered keywords are extracted. A degree of importance is determined for each extracted category based on a function of the identified registered keywords in the category dictionary and/or a function of the identified co-occurring registered keywords. The extracted categories are outputted, with at least an indication of each category's relative importance, as category candidates for categorizing the keyword to be categorized.

The summary of the present invention provided above is not intended to enumerate all of the required features of the present invention, and it is to be understood that the present invention includes all combinations and sub-combinations of these constituent elements.

DETAILED DESCRIPTION

The following is an explanation of the present invention with reference to a preferred embodiment of the present invention. However, the present embodiment does not limit the present invention in the scope of the claims. Also, all combinations of characteristics explained in the embodiment are not necessarily required in the technical solution of the present invention.

Figure 1:
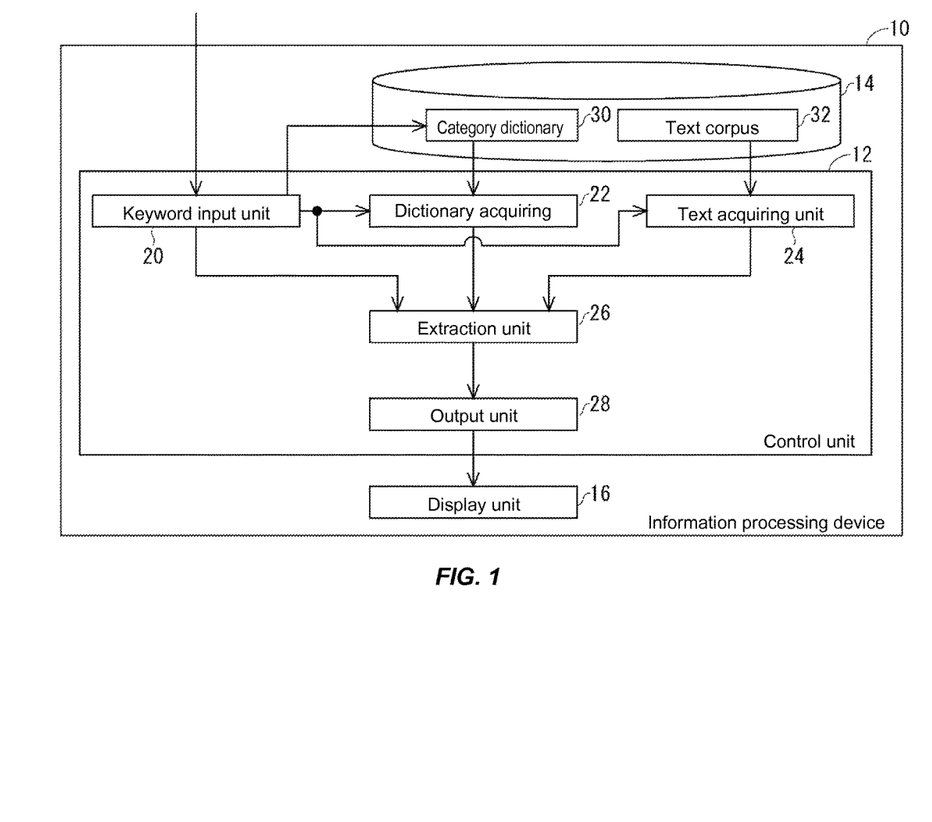
FIG. 1 is a block diagram of the information processing device, in accordance with an embodiment of the invention.

FIG. 1 is a block diagram of an information processing device 10. When a keyword to be categorized is being categorized, the information processing device 10 searches a category dictionary 30 for categories assigned to registered keywords on the basis of co-occurrence or degree of similarity based, for example, on the edit distance of characters. In this way, the information processing device 10 improves the categorization accuracy of keywords to be categorized. For example, when the keyword to be categorized is related to medical care, the information processing device 10 outputs as candidates categories related to medical care such as "disease names" and "adult diseases".

In the example, the keyword to be categorized is a new word and an unknown word. A new word is known to be a word but has appeared for the first time in the category dictionary 30 as an uncategorized word. An example of a new word is "left-sided facial paralysis", which includes "left-sided" and "paralysis" which are already found in the category dictionary 30. An unknown word is a character string determined to have a high probability of being a word according to linguistic analysis. An example of an unknown word is "norovirus" which includes the unknown prefix "noro" not found in the category dictionary 30.

As shown in FIG. 1, the information processing device 10 includes a control unit 12, a storage device 14, and a display device 16. The information processing device 10 does not have to include a storage device 14 and/or display device 16, and may use an external storage device 14 and/or display device 16.

An example of a control unit 12 is an arithmetic processing device such as a central processing module (CPU). The control unit 12 includes a keyword input module 20, a dictionary acquiring module 22, a text acquiring module 24, an extraction module 26, and an output module 28. The control unit 12 may also function as the keyword input module 20, dictionary acquiring module 22, text acquiring module 24, extraction module 26, and output module 28 by reading a program for extracting category candidates. Some or all of the keyword input module 20, dictionary acquiring module 22, text acquiring module 24, extraction module 26, and output module 28 may be configured as circuits or other types of hardware.

The keyword input module 20 is connected to the dictionary acquiring module 22, text acquiring module 24, extraction module 26, and storage device 14 so as to be able to exchange information. The keyword input module 20 is used to receive keywords to be categorized. The keyword input module 20 can be used to receive a keyword entered by a user as a keyword to be categorized using an input device such as a keyboard or touch panel. The keyword input module 20 inputs keywords to be categorized to the dictionary acquiring module 22, the text acquiring module 24, and the extraction module 26. The keyword input module 20 may also associate categories eventually selected by the user among category candidates with keywords to be categorized and register the association in the category dictionary 30 kept in the storage device 14.

The dictionary acquiring module 22 is connected to the storage device 14 and the extraction module 26 so as to be able to exchange information. The dictionary acquiring module 22 receives from the storage device 14 a category dictionary 30 in which a category has been assigned to each of a plurality of registered keywords. The dictionary acquiring module 22 outputs the received category dictionary 30 to the extraction module 26.

The text acquiring module 24 is connected to the storage device 14 and the extraction module 26 so as to be able to exchange information. The text acquiring module 24 may be stored in the storage device 14 and receives a text corpus 32 that includes more than one text. The text acquiring module 24 outputs the text or text corpus 32 to an extraction module 26.

The extraction module 26 receives keywords to be categorized from the keyword input module 20. The extraction module 26 also receives the category dictionary 30 from the dictionary acquiring module 22. The extraction module 26 receives a text or text corpus 32 from the text acquiring module 24.

The extraction module 26 searches the category dictionary 30 for registered keywords having a degree of similarity to the keyword to be categorized that exceeds a predetermined reference value. For example, the extraction module 26 calculates the degree of similarity based on edit distances when searching for registered keywords. The extraction module 26 also searches the text for registered keywords co-occurring with the keyword to be categorized. For example, the extraction module 26 searches the text received by the text acquiring module 24 for co-occurring keywords which occur along with the keyword to be categorized. The extraction module 26 also searches the co-occurring keywords for registered keywords present in the category dictionary 30. The extraction module 26 extracts categories assigned to the retrieved registered keywords from the category dictionary 30. The extraction module 26 is connected to the output module 28 so as to be able to exchange information. The extraction module 26 associates at least some of the extracted categories to registered keywords and outputs the associations to the output module 28. The extraction module 26 may output all of the categories in the category dictionary 30 to the output module 28 so as to be identifiable as category candidates.

The output module 28 is connected to the display device 16 so as to be able to exchange information. The output module 28 receives extracted categories from the extraction module 26. The output module 28 outputs the retrieved and extracted categories as category candidates for categorization of a keyword to be categorized. The output module 28 may associate categories assigned to each of the extracted registered keywords, and output them to the user. In this way, the output module 28 can output the categories of registered keywords so as to be identifiable as category candidates. The output module 28 may also output each of the retrieved and extracted registered keywords so as to be identifiable as being from a search of extracted registered keywords based on the degree of similarity or on co-occurrence.

The storage device 14 stores the programs executed by the information processing device 10 and information required in the execution of the programs such as threshold values. For example, the storage device 14 stores the program used to extract category candidates which is executed when the information processing device 10 is categorizing a keyword to be categorized. The storage device 14 also stores a category dictionary 30 and a text corpus 32 including more than one text which are required when the program for extracting category candidates is executed.

The display device 16 displays the information received by the output module 28. Examples of display devices 16 include liquid crystal display devices and organic EL display devices.

Figure 2:
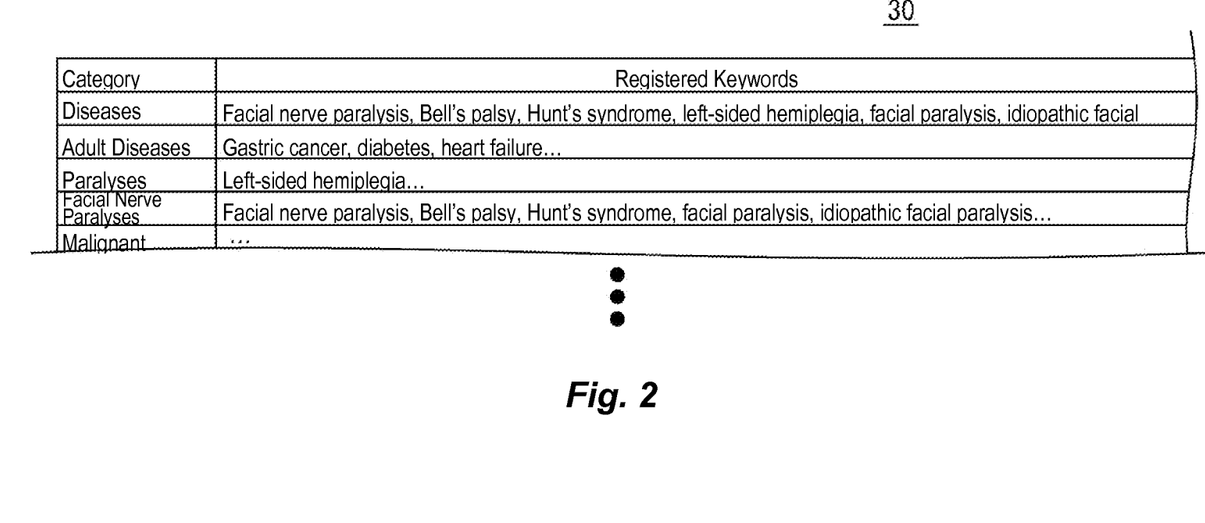
FIG. 2 illustrates a category dictionary of the information processing device of FIG. 1, in accordance with an embodiment of the invention.

FIG. 2 is an example of a category dictionary 30 stored in the storage device 14. In the category dictionary 30, at least one category is assigned to one or more registered keywords.

For example, "disease name" and "facial nerve paralysis" are associated with the registered keyword "facial nerve paralysis" as categories. Also, "gastric cancer", "diabetes" and "heart failure" are associated with the category "adult disease" as registered keywords. When a keyword to be categorized is a keyword related to medical care, the category dictionary 30 may be a medical dictionary.

Figure 3:
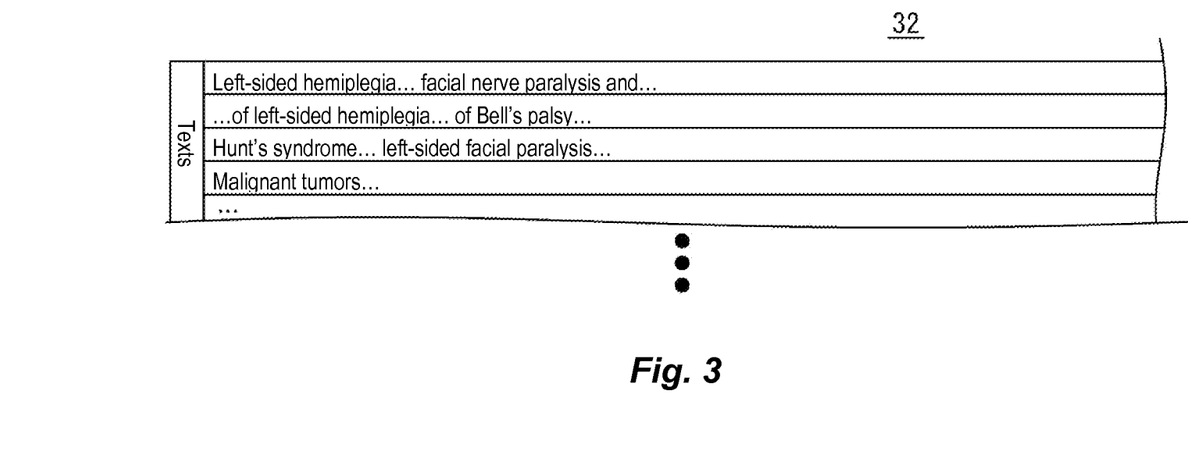
FIG. 3 illustrates a text corpus, in accordance with an embodiment of the invention.

FIG. 3 is an example of a text corpus 32 stored in the storage device 14. The text corpus 32 includes a plurality of texts. For example, as shown at the top, the text corpus 32 has texts including "left-sided facial paralysis" and "facial nerve paralysis". In this way, when the keyword to be categorized is "left-sided facial paralysis", the extraction module 2 can extract, as search results, co-occurrence keywords occurring along with "facial nerve paralysis". When the keyword to be categorized is a keyword related to medical care, the text corpus 32 may primarily include medical texts. When the keyword to be categorized is to be categorized with respect to health insurance categories, the text corpus 32 may include one or more texts among application forms for health insurance.

Figure 4:
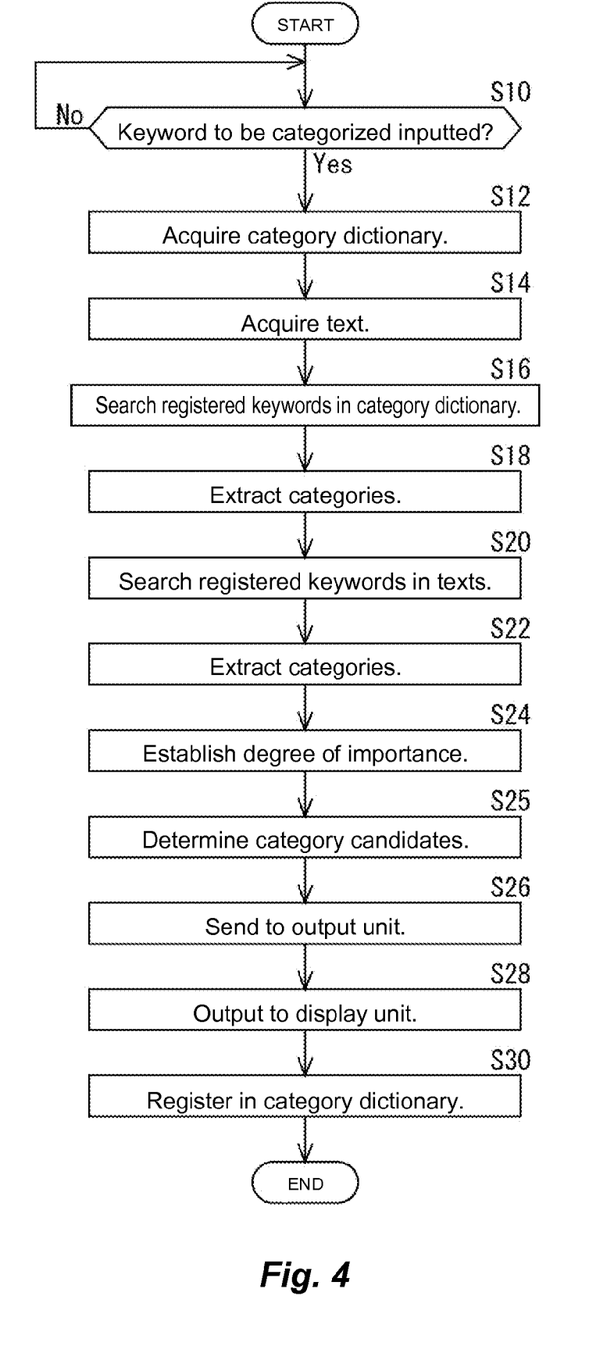
FIG. 4 is a flowchart depicting operational steps of the category candidate extraction process executed by the information processing device, in accordance with an embodiment of the invention.
Figure 5:
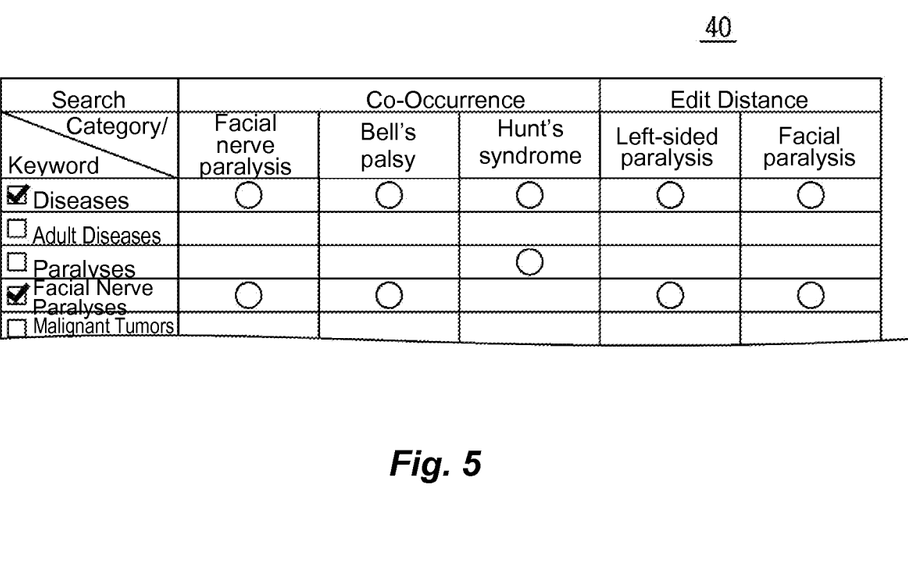
FIG. 5 illustrates a display screen displayed on the display device including the results of the category candidate extraction process, in accordance with an embodiment of the invention.

FIG. 4 is a flowchart depicting operational steps of the category candidate extraction process executed by the information processing device 10, in accordance with an embodiment of the invention. FIG. 5 is an example of a display screen displayed on the display device 16 including the results of the category candidate extraction process. The information processing device 10 executes the process of extracting category candidates by retrieving the program used to extract category candidates.

When the category extraction process has been started, as shown in FIG. 4, the keyword input module 20 determines whether or not a keyword to be categorized has been entered (S10). The keyword input module 20 remains in standby until a keyword to be categorized has been entered (S10: No). When the keyword input module 20 determines that the user has used the keyboard to enter a keyword to be categorized (S10: Yes), the keyword to be categorized is outputted to the dictionary acquiring module 22, the text acquiring module 24 and the extraction module 26. The keyword input module 20 may extract from the text corpus 32 keywords to be categorized which remain uncategorized in the category dictionary 30. In an exemplary embodiment, the keyword input module 20 receives "left-sided facial paralysis" as the keyword to be categorized.

When a keyword to be categorized has been inputted from the keyword input module 20, the dictionary acquiring module 22 receives a category dictionary 30 from the storage device 14 (S12). The dictionary acquiring module 22 outputs the received category dictionary 30 to the extraction module 26.

When a keyword to be categorized has been inputted from the keyword input module 20, the text acquiring module 24 receives a text corpus 32 including more than one text from the storage device 14 (S14). The text acquiring module 24 outputs the received text corpus 32 to the extraction module 26.

The extraction module 26 extracts from the category dictionary 30 received from the dictionary acquiring module 22 all registered keywords whose degree of similarity exceeds a reference value on the basis of edit distance with respect to the keyword to be categorized received from the keyword input module 20 (S16). In the present embodiment, the extraction module 26 calculates the degree of similarity as the inverse of the edit distance, that is, "degree of similarity=1/edit distance".

The extraction module 26 can calculate the edit distance using 1 as the cost of any insertion, deletion or substitution. If "left-sided" is deleted from "left-sided facial paralysis", the keyword to be categorized, to leave "facial paralysis", the extraction module 26 calculates the editing distance of "facial paralysis" to be 1. Here, the extraction module 26 calculates the degree of similarity from the edit distance as 1. When the reference value is 0.5 or higher, the extraction module 26 extracts from the category dictionary 30 "facial paralysis", which has a degree of similarity of 1, as a registered keyword in the search results. After the edit distance to each registered keyword in the category dictionary 30 has been calculated, the extraction module 26 calculates the degrees of similarity, and extracts from the category dictionary 30 all registered keywords with a degree of similarity exceeding the reference value. The reference value may be fixed or variable. When the reference value is variable, the extraction module 26 may calculate the reference value as a function of the number of characters in the keyword to be categorized. In this case, the extraction module 26 reduces the size of the reference value as the number of characters in the keyword to be categorized increases.

The extraction module 26 extracts from the category dictionary 30, as category candidates, the categories assigned to all of the registered keywords whose degree of similarity exceeds a reference value (S18). For example, the extraction module 26 extracts "disease name" and "facial nerve paralysis" assigned to "facial paralysis" in the category dictionary 30 shown in FIG. 2.

The extraction module 26 searches the texts in the text corpus 32 received from the text acquiring module 24 for registered keywords co-occurring with the keyword to be classified (S20).

For example, the extraction module 26 searches the text at the top of FIG. 3 for the co-occurring keyword "facial nerve paralysis" which co-occurs with "left-sided facial paralysis", the keyword to be categorized, in one document. The extraction module 26 may extract as a co-occurring keyword only those keywords co-occurring in the one text within a certain number of words of the keyword to be categorized. Next, the extraction module 26 determines whether or not the co-occurring keyword "facial nerve paralysis" is a registered keyword in the category dictionary 30. Because the co-occurring keyword "facial nerve paralysis" is a registered keyword in the category dictionary 30, the extraction module 26 extracts it as a registered keyword. The extraction module 26 searches the keywords in the category dictionary 30 for all co-occurring keywords occurring in the text with the keyword to be categorized, and extracts them.

The extraction module 26 may extract all registered keywords in the category dictionary 30, and then search for and extract registered keywords co-occurring with the keyword to be categorized based on whether or not the registered keyword co-occurs in a text with the keyword to be categorized.

The extraction module 26 extracts from the category dictionary 30 as category candidates those categories assigned to the extracted registered keywords co-occurring in the text (S22). For example, the extraction module 26 extracts, as categories, "disease name" and "facial nerve paralysis" assigned to "facial nerve paralysis" in the category dictionary 30 shown in FIG. 2.

The extraction module 26 establishes the degree of importance of each category in accordance with the number of retrieved registered keywords (S24). For example, when there are five registered keywords extracted in accordance with the degree of similarity based on edit distance or in accordance with co-occurrence with respect to the extracted category "disease name"—those five being "facial nerve paralysis", "Bell's palsy", "Hunt's syndrome", "left-sided hemiplegia" and "facial paralysis"—the extraction module 26 sets five degrees of importance.

The extraction module 26 determines the category candidates on the basis of degree of importance (S25). For example, the extraction module 26 sets categories with a high degree of importance as category candidates. In this case, the extraction module 26 may set as category candidates those categories with a degree of importance among the N % highest or the M highest. Here, the values N and M are established beforehand. The extraction module 26 may also set as category candidates those categories with a degree of importance exceeding a candidate threshold value.

The extraction module 26 associates the extracted registered keywords, category candidates and search methods with each other, and outputs them to the output module 28. Here, the search methods include searches based on degree of similarity such as edit distance and searches based on co-occurrence. The extraction module 26 outputs all categories in the category dictionary 30 to the output module 28 (S26).

The output module 28 outputs the registered keywords, categories including category candidates, and search methods received from the extraction module 26 to the display device 16 (S28). For example, the output module 28 displays on the display device 16 the display screen 40 shown in FIG. 5.

In the display screen 40 shown in FIG. 5, the cell in the column on the left side includes all of the categories in the category dictionary 30. The categories in the column on the left side with a check mark are category candidates used to categorize the keyword to be categorized "left-sided facial paralysis". In the display screen 40, each cell in the second row from the top includes a registered keyword extracted by the extraction module 26 on the basis of co-occurrence and edit distance. Each cell in the row at the very top indicates the search method used to retrieve the registered keywords in the second row from the top. In the present embodiment, the search method is either co-occurrence or edit distance. Degree of similarity may be displayed instead of edit distance. In this way, the output module 28 can indicate to the user which search method was used to extract each registered keyword.

In the display screen 40, each cell from the second column on the left and from the third row on the top indicates which registered keywords are associated with which categories. For example, because the category "disease name" has been assigned to registered keyword "facial nerve paralysis" in the category dictionary 30, a circle is present in the intersecting cell. Therefore, in the example shown in FIG. 5, the extraction module 26 sets 5, 1 and 4 as the degrees of importance for the categories "disease name", "paralysis" and "facial nerve paralysis". Because their degrees of importance are high, the extraction module 26 establishes categories "disease name" and "facial nerve paralysis" as category candidates. Therefore, the output module 28 places a check mark next to "disease name" and "facial nerve paralysis" on the display screen 40 so that the category candidates may be readily distinguished from the other categories extracted by the extraction module 26. The order of display for the categories may be established differently. The order of display for the categories can also be changed by the user.

The user then refers to the display screen 40 in determining which categories are to be used to categorize the keyword "left-sided facial paralysis". The user may, for example, use an input device such as a mouse or keyboard to add or remove check marks from each category in sorting through the category candidates extracted by the information processing device 10. In this way, the categories to be used to categorize a keyword are determined. Note that the user may use any of the categories as a category candidate, even those not selected as category candidates by the extraction module 26.

The keyword input module 20 receives the categories determined by the user, associates the categories with the keyword to be categorized, and adds and registers them in the category dictionary (S30).

In the information processing device 10 as described above, the extraction module 26 extracts category candidates for a keyword to be categorized using both co-occurrence and the inverse of the edit distance, which is one example of degree of similarity. Therefore, the information processing device 10 can extract category candidates with greater accuracy compared to a situation in which category candidates are extracted using either co-occurrence or degree of similarity based on edit distance. The information processing device 10 can also improve category selection efficiency by the user even as the category dictionary 30 becomes larger and the number of categories has increased.

Because the extraction module 26 can search for registered keywords using the degree of similarity based on edit distances, category candidates can be extracted on the basis of registered keywords even when the keyword to be categorized is a new word or completely unknown word. Similarly, because the extraction module 26 can search for registered keywords using edit distances, category candidates can be extracted even when the user has incorrectly entered the keyword to be categorized.

In the information processing device 10, the extraction module 26 sets degrees of importance for categories based on the number of registered keywords retrieved from the category dictionary 30 using co-occurrence and degree of similarity such as edit distance, and selects the categories with high degrees of importance as category candidates. In this way, the information processing device 10 can improve further improve the accuracy of category candidate extraction using degrees of importance.

In the information processing device 10, the extraction module 26 establishes a reference value based on the number of characters in the keyword to be categorized. More specifically, the extraction module 26 can further improve the accuracy of category candidate extraction among unnecessarily extracted categories by lowering the reference value as the number of characters in the keyword to be categorized increases.

The following is an explanation of an embodiment in which the information processing device 10 described above has been partially modified.

Change in Degree of Importance

In the embodiment explained below, the method used to establish the degree of importance of each category has been changed.

The extraction module 26 may calculate the degree of importance on the basis of each combination of extracted categories.

More specifically, the extraction module 26 may set the degree of importance of categories on the basis of the number of identical combinations among the combinations with each category extracted using each registered keyword. For example, in the example shown in FIG. 5, there are four category combinations with "disease name" and "facial nerve paralysis", so the extraction module 26 sets a degree of importance of 4 for the categories "disease name" and "facial nerve paralysis" included in combinations of these categories. Because there is one category combination of "disease name" and "paralysis", the extraction module 26 sets a degree of importance of 1 for the categories "disease name" and "facial nerve paralysis" included in the combination with these categories. Here, the extraction module 26 may set a larger degree of importance for categories having multiple degrees of importance. In the example described above, the extraction module 26 has set two degrees of importance for the category "disease name", but it may also set a higher degree of importance for the category "disease name", such as 4.

The extraction module 26 may also set degrees of importance for categories based on the number of identical combinations among the combinations of categories obtained using the same registered keyword search method.

More specifically, the extraction module 26 sets the degree of importance for a category based on the number of identical combinations among the combinations of categories extracted in accordance with registered keywords retrieved on the basis of the degree of similarity to the keyword to be categorized, such as the inverse of the edit distance. In the example shown in FIG. 5, the extraction module 26 sets a degree of importance of 2 for each of the categories "disease name" and "facial nerve paralysis" because there are two identical combinations of "disease name" and "facial nerve paralysis" among the combinations of categories with the registered keywords "left-sided paralysis" and "facial paralysis" retrieved on the basis of edit distance.

The extraction module 26 also sets the degree of importance for a category based on the number of identical combinations among the combinations of categories extracted in accordance with registered keywords retrieved on the basis of co-occurrence with the keyword to be categorized. In the example shown in FIG. 5, the extraction module 26 sets a degree of importance of 2 for each of the categories "disease name" and "facial nerve paralysis" because there are two identical combinations of "disease name" and "facial nerve paralysis" among the combinations of categories with the registered keywords "facial nerve paralysis", "Bell's palsy" and "Hunt's syndrome". A degree of importance of 1 is set for each of the categories "disease name" and "paralysis" because there is one combination of "disease name" and "paralysis" among the combinations with the category "Hunt's syndrome". Here, the extraction module 26 may set a larger degree of importance for categories having multiple degrees of importance.

Priority of Registered Keywords

The following is an explanation of the priority of registered keywords. In the embodiment described above, the retrieved registered keywords were treated as having the same priority, but the extraction module 26 may establish different priority levels for registered keywords.

The extraction module 26 uses the number of characters in the keyword to be categorized to establish a priority level for registered keywords retrieved from the category dictionary 30 based on their degree of similarity to the keyword to be categorized, and for registered keywords retrieved based on co-occurrence with the keyword to be categorized. For example, as the number of characters in the keyword to be categorized increases, the extraction module 26 raises the priority level of registered keywords retrieved based on their degree of similarity to the keyword to be categorized relative to the priority level of registered keywords retrieved based on co-occurrence with the keyword to be categorized. In this case, one of the priority levels may be 0. For example, the priority level of registered keywords retrieved based on co-occurrence with the keyword to be categorized may be set to 0 when the number of characters in the keyword to be categorized exceeds a predetermined threshold value for the number of characters.

In this way, the extraction module 26 can increase the priority level of a registered keyword retrieved on the basis of degree of similarity in which the search accuracy improves as the number of characters in the keyword to be categorized increases. More specifically, the extraction module 26 is able to effectively set priorities when the inverse of the edit distance is used as the degree of similarity.

The extraction module 26 may also set a priority level that is different for each retrieved registered keyword on the basis of the degree of similarity to the keyword to be categorized. For example, the extraction module 26 sets a high priority level for a registered keyword with a high degree of similarity. More specifically, the extraction module 26 sets a higher priority level for a registered keyword with a shorter edit distance when the inverse of the edit distance is used as the degree of similarity. In other words, the extraction module 26 sets a higher priority level for a registered keyword with a greater degree of similarity.

The extraction module 26 may also set a priority level that is different for each retrieved registered keyword on the basis of a co-occurrence scale CS indicating the extent of co-occurrence. In one example, the extraction module 26 calculates a co-occurrence scale CS using Equation (1) below.

$$CS = \frac{\frac{\#(A \cap B)}{\#X}}{\frac{\#A}{\#X} \cdot \frac{\#B}{\#X}} = \frac{\#X \#(A \cap B)}{\#A \#B} \quad (1)$$

A: Number of texts including the keyword to be categorized.

B: Number of texts including registered keywords co-occurring with the keyword to be categorized.

X: Number of texts in the text corpus.

In Equation (1), #B is the number of texts in the text corpus including both the keyword to be categorized and a co-occurring registered keyword as well as those including only the co-occurring registered keyword.

Figure 6:
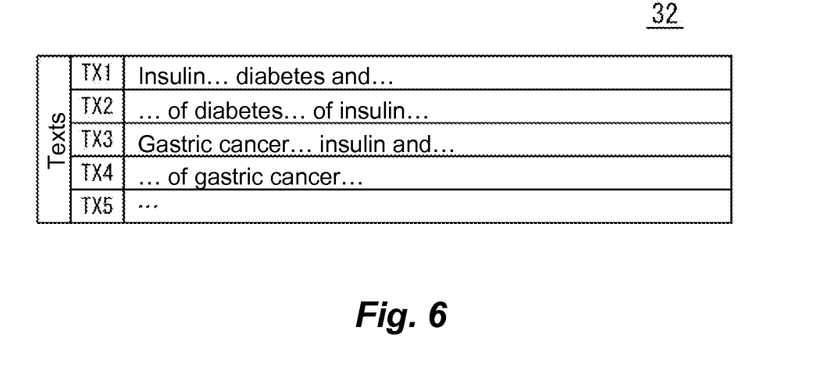
FIG. 6 illustrates a text corpus, in accordance with an embodiment of the invention.

FIG. 6 is an example of a text corpus 32. The following is an explanation of the method used to calculate co-occurrence scales CS in the text corpus 32 shown in FIG. 6. The text corpus 32 shown in FIG. 6 includes five texts. The reference numbers TX1 through TX5 have been assigned to the texts. The keyword to be categorized is "insulin". The keyword to be categorized "insulin" co-occurs with "gastric cancer" and "diabetes". Both "gastric cancer" and "diabetes" have been registered in the category dictionary 30.

The co-occurrence scale CS of "gastric cancer" with "insulin" will be explained first. In the case of "gastric cancer", #A is 3, #B is 2, #X is 5, and #(A∩B) is 1. Therefore, the co-occurrence scale CS of "gastric cancer" is 5/6. As for the co-occurrence scale CS of "diabetes" with "insulin", #A is 3, #B is 2, #X is 5, and #(A∩B) is 2. Therefore, the co-occurrence scale CS of "diabetes" is 5/3. Note that the co-occurrence scale CS increases as the number of texts in which both the keyword to be categorized and the registered keywords occur increases, and the number of texts in which the registered keyword occurs alone decreases.

The extraction module 26 increases the priority level of a registered keyword as the co-occurrence scale CS calculated by the Equation (1) becomes greater.

The extraction module 26 may establish the degree of importance of an extracted category on the basis of the priority level of registered keywords. For example, the extraction module 26 may establish, as the degree of importance for each category, the sum total of all priority levels included in each category. The extraction module 26 may also calculate, as a combined priority level, the sum total of the priority levels of the registered keywords in the combination when the degree of importance is to be calculated on the basis of combinations of categories. The extraction module 26 may then establish, as the degree of importance for a combination or the categories in the combination, a value obtained by multiplying the number of combinations by the priority level of the combination.

Variation on Search Method

The following is an explanation of another example of a search method. The extraction module 26 may search for registered keywords using a search method other than degree of similarity based on edit distance or co-occurrence.

For example, the extraction module 26 may search a category dictionary 30 for registered keywords including a keyword to be categorized, extract from the category dictionary 30 categories assigned to the retrieved registered categories, associate the categories with the retrieved registered keywords, and output them to the output module 28.

Figure 7:
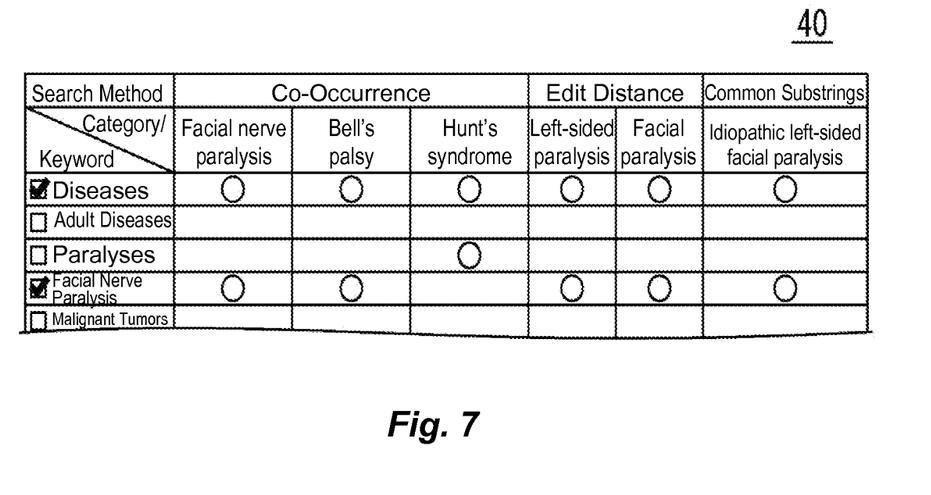
FIG. 7 illustrates a display screen including registered keywords searched using common substrings, in accordance with an embodiment of the invention.

More specifically, when the keyword to be categorized is "left-sided facial paralysis", the extraction module 26 retrieves from the category dictionary 30 "idiopathic left-sided facial paralysis" which is a registered keyword including a common substring. For example, when "idiopathic left-sided facial paralysis" is included in the category dictionary 30, the extraction module 26 extracts the categories assigned to "idiopathic left-sided facial paralysis". Here, the categories assigned to "idiopathic left-sided facial paralysis" are "disease name" and "facial nerve paralysis". The extraction module 26 associates the categories "disease name" and "facial nerve paralysis" to the registered keyword "idiopathic left-sided facial paralysis", and outputs them to the output module 28.

FIG. 7 is an example of a display screen 40 including registered keywords searched using common substrings. As shown in FIG. 7, the output module 28 outputs on the display device 16 for the user a display screen 40 indicating the registered keywords and categories retrieved on the basis of common substrings. For example, the output module 28 outputs a display screen 40 in which the cells corresponding to the categories "disease name" and "facial nerve paralysis" assigned to the registered keyword "idiopathic left-sided facial paralysis" are indicated by a circle.

Variation on Method of Display

Figure 8:
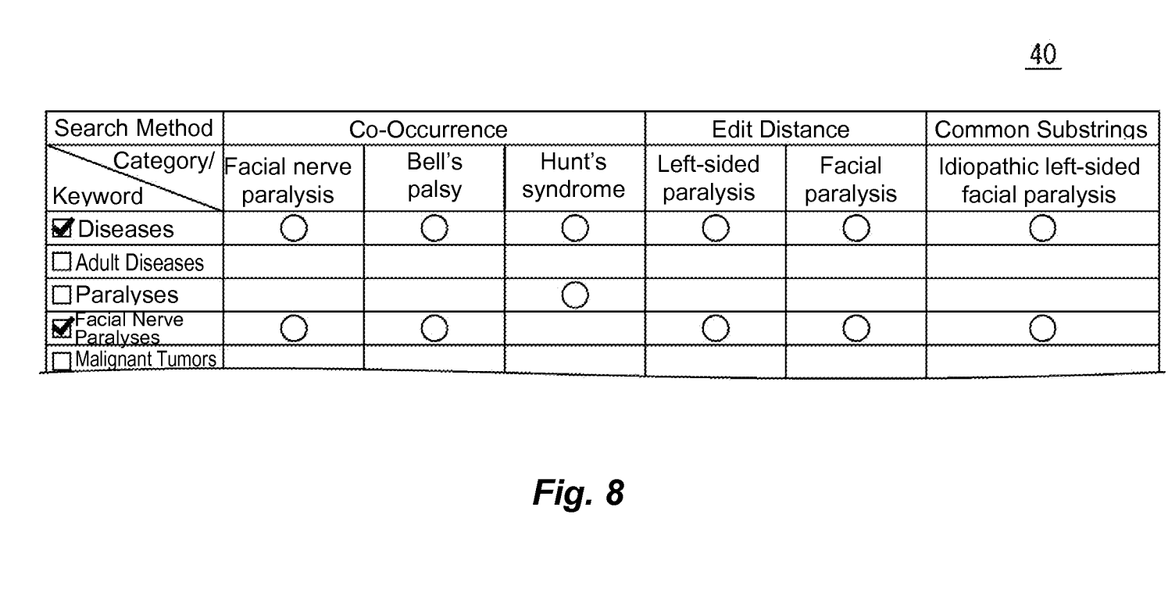
FIG. 8 illustrates a modified display screen, in accordance with an embodiment of the invention.

The following is an explanation of another display screen 40. The output module 28 may change the display screen 40 shown on the display device 16 if necessary.

FIG. 8 is an example of the modified display screen 40. The output module 28 may, for example, output registered keywords retrieved by the extraction module 26 so that the registered keywords including a portion of the keyword to be categorized are displayed differently. For example, when the keyword to be categorized is "left-sided facial paralysis", the output module 28 displays differently from other registered keywords the registered keywords including the substring "facial paralysis" from the keyword to be categorized. Here, the substring is enlarged and outlined in white. In this way, when a keyword to be categorized has been registered in the category dictionary 30, the information processing device 10 enables the user to see registered keywords competing with those not extracted on the basis of a longer match.

The output module 28 may also output registered keywords retrieved by the extraction module 26 so that the registered keywords including the keyword to be categorized are displayed differently. For example, when the keyword to be categorized is "left-sided facial paralysis", the output module 28 displays differently from other registered keywords the registered keyword "idiopathic left-sided facial paralysis" which includes the keyword to be categorized. In this way, the information processing device 10 enables the user to see registered keywords competing with those not extracted on the basis of a longer match even when the keyword to be categorized has been registered in the category dictionary 30.

In the embodiment described above, the output module 28 displayed all categories including the category candidates. However, it may also display category candidates only. The output module 28 may also establish the order of display for the categories on the basis of the degree of importance of each category.

Other Variations

The following is an explanation of examples in which the information processing device 10 has been partially modified. The extraction module 26 may assign extracted category candidates to registered keywords and record them in the category dictionary 30 without any user input. In this case, the keyword input module 20 may combine category candidates extracted by the extraction module 26 with categories determined by the user, and register them in the category dictionary 30. In this case, the extraction module 26 and the keyword input module 20 may register them so that categories extracted by the extraction module 26 can be differentiated from categories determined by the user.

The extraction module 26 may also have a learning function. For example, the extraction module 26 may learn category candidates as logistic regression problems. More specifically, the extraction module 26 uses as an objective variable whether or not an extracted category candidate has been registered in the category dictionary 30 by the user. The extraction module 26 may use the number of registered keywords having a certain degree of similarity based on edit distance as an explanatory variable. For example, the extraction module 26 may use the inverse of the edit distance as the degree of similarity and the number of registered keywords having a degree of similarity exceeding a threshold value as the explanatory variable. The extraction module 26 may use the number of registered keywords having a certain co-occurrence scale as an explanatory variable. For example, the extraction module 26 may use the number of registered keywords having a co-occurrence scale exceeding a threshold value as the explanatory variable. In this way, the extraction module 26 is able to extract category candidates with a high degree of accuracy.

In the learning function described above, the extraction module 26 may use as an objective variable whether or not an extracted category candidate is to be registered in the category dictionary 30. This is especially effective when extracted category candidates are registered in a category dictionary without user intervention.

Figure 9:
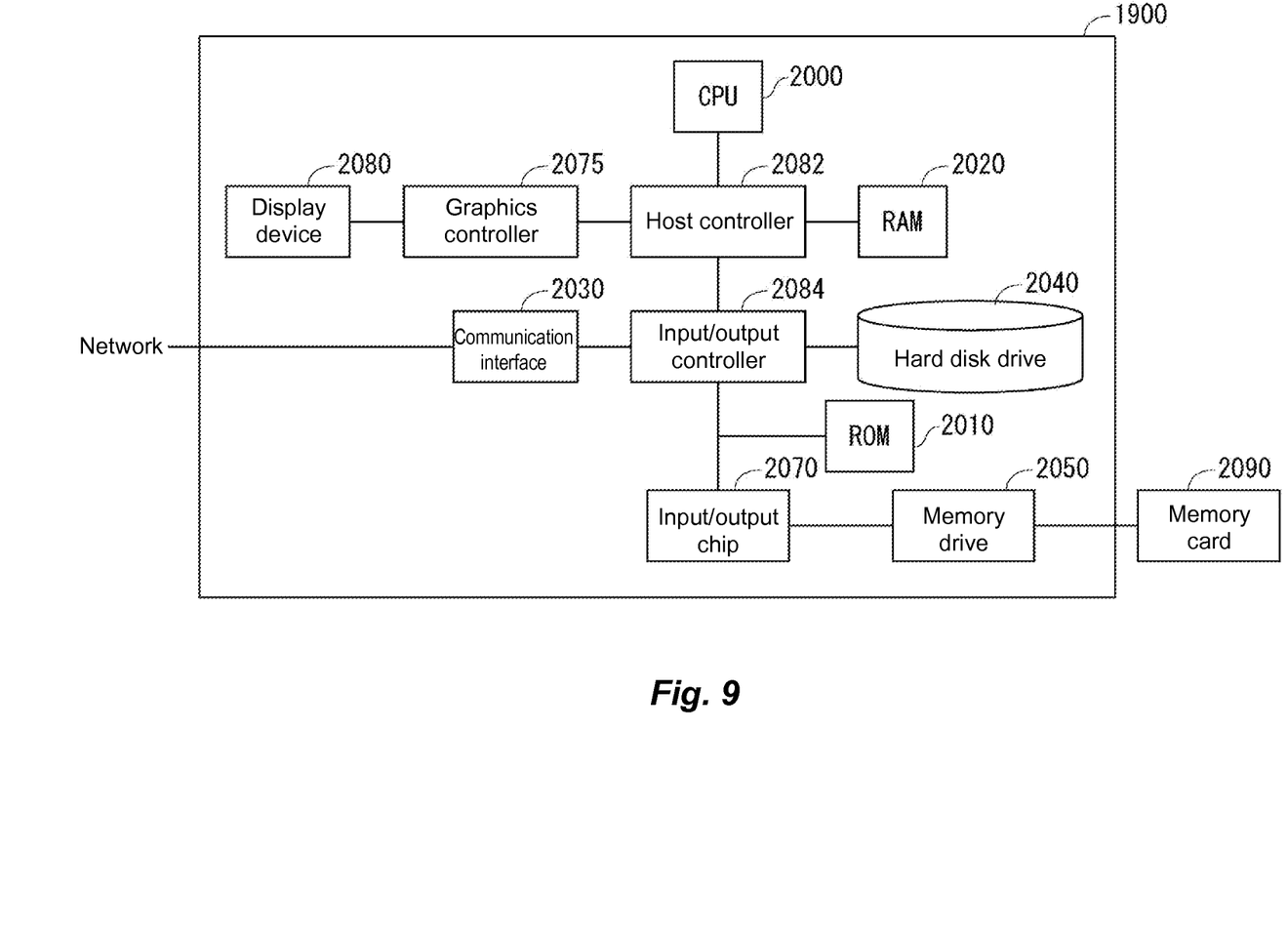
FIG. 9 illustrates the hardware configuration of a computer, in accordance with an embodiment of the invention.

FIG. 9 shows an example of a hardware configuration for a computer 1900 in the present embodiment. The computer 1900 is an example of an information processing device 10. The computer 1900 is equipped with a CPU peripheral portion having a CPU 2000, RAM 2020, graphics controller 2075 and display device 2080 connected to each other by a host controller 2082, an input/output portion having a communication interface 2030 and a hard disk drive 2040 connected to the host controller 2082 by an input/output controller 2084, and a legacy input/output portion having a ROM 2010, memory disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various modules. The graphics controller 2075 receives the image data generated in the frame buffer of the RAM 2020 by the CPU 2000 and other modules, and displays this image data on the display device 2080. Alternatively, the graphics controller 2075 can include a frame buffer for storing image data generated by the CPU 2000 and other modules.

The input/output controller 2084 is connected to a host controller 2082, a communication interface 2030 serving as a relatively high-speed input/output device, and a hard disk drive 2040. The communication interface 2030 communicates with the other devices via a network. The hard disk drive 2040 stores programs, such as the display program used by the CPU 2000 in the computer 1900, and data.

The input/output controller 2084 is connected to the ROM 2010, a memory drive 2050, and the relatively low-speed input/output device of the input/output chip 2070. The ROM 2010 stores the boot program executed by the computer 1900 at startup and/or programs relying on hardware in the computer 1900. The flexible disk drive 2050 reads programs or data from a memory card 2090, and provides the programs and data to the hard disk drive 2040 via the RAM 2020. The input/output chip 2070 connects the flexible disk drive 2050 to the input/output controller 2084, and various types of input/output devices are connected to the input/output controller 2084 via a parallel port, serial port, keyboard port, or mouse port, etc.

A program provided to the hard disk drive 2040 via the RAM 2020 is stored on a recording medium such as a memory card 2090 or IC card provided by the user. A program is read from the recording medium, installed in the hard disk drive 2040 inside the computer 1900 via the RAM 2020, and executed by the CPU 2000.

Programs causing the computer 1900 to function as the information processing device 10 include a keyword input module, dictionary acquiring module, text acquiring module, extraction module, and output module. These programs or modules may work with the CPU 2000 and other components to cause the computer 1900 to function as the keyword input module, dictionary acquiring module, text acquiring module, extraction module, and output module.

The information processing steps written in these programs are specific means activated by reading the programs to the computer 1900 so that the software cooperates with the various types of hardware resources described above. These specific means function as the keyword input module, dictionary acquiring module, text acquiring module, extraction module, and output module. These specific means realize operations and the processing of information in the computer 1900 of the present embodiment to construct an information processing device 10 for this intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040 or memory card 2090, or writes reception data received from the network to a reception buffer region of the storage device. In this way, the communication interface 2030 transfers transmitted and received data to a storage device using the direct memory access (DMA) method. Alternatively, the CPU 2000 transfers transmitted and received data by reading data from the source storage device or communication interface 2030, and transfers and writes data to the destination communication interface 2030 or storage device.

Also, the CPU 2000 writes all of the data or the necessary data to the RAM 2020 via, for example, a DMA transfer, from files or databases stored in an external storage device such as a hard disk drive 2040 or a memory drive 2050 (memory card 2090), and performs various types of processing on the data in the RAM 2020. The CPU 2000 then writes the processed data to an external storage device via, for example, a DMA transfer. Because the RAM 2020 temporarily stores the contents of the external storage device during this process, the RAM 2020 and the external storage device are generally referred to in the present embodiment as memory, a storage module, or a storage device. The various types of information in the programs, data, tables and databases of the present embodiment are stored in these memory devices, and are the targets of information processing. The CPU 2000 can hold some of the RAM 2020 in cache memory, and read and write data to the cache memory. Even here the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine. The CPU 2000 can also search for information stored in files in the storage device or in a database.

A program or module described above can be stored in a recording medium of an external module. Instead of a memory card 2090, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained above using an embodiment, but the technical scope of the present invention is not limited to the embodiment described above. The possibility of many modifications and improvements to this embodiment should be apparent to those skilled in the art, and any embodiments including these modifications and improvements are clearly within the technical scope of the present invention, as should be clear from the description in the claims.

The order of execution for operations, steps and processes in the devices, systems, programs and methods described in the claims, description and drawings were described using such terms as "previous" and "prior". However, these operations, steps and processes can be realized in any order as long as the output of the previous process is used by the subsequent process. The operational flow in the claims, description and drawings were explained using terms such as "first" and "next" for the sake of convenience. However, the operational flow does not necessarily have to be executed in this order.

What is claimed is:

1. A method for categorizing keywords, the method comprising:
   receiving, by a computer and based on user input to a keyboard connected to the computer, a keyword to be categorized;
   receiving, by the computer and from a storage device, a medical category dictionary including categories having associated respective pluralities of registered keywords;
   receiving, by the computer and from the storage device, a text corpus comprising medical texts;
   identifying, by the computer, one or more registered keywords in the medical category dictionary having a degree of similarity to the keyword to be categorized that is equal to or greater than a predetermined value, and extracting the categories associated with the identified registered keywords;
   identifying, by the computer, one or more registered keywords co-occurring in the text corpus with the keyword to be categorized, and extracting the categories associated with the identified co-occurring registered keywords;
   determining, by the computer, a degree of importance of each extracted category based on a function of the identified registered keywords in the category dictionary and a function of the identified co-occurring registered keywords; and
   outputting, by the computer and to a display screen, the extracted categories, with at least an indication of each category's relative importance, as category candidates for categorizing the keyword to be categorized, wherein the display screen presents a table comprising a respective row for respective categories from the category dictionary, a respective column for respective registered keywords, and a respective indication of a search method associated with respective registered keywords.

2. A method in accordance with claim 1, wherein the degree of similarity is determined on the basis of the number of insertion, deletion, and/or substitution edits required to be performed on the keyword to be categorized for the resulting edited word to match a registered keyword.

3. A method in accordance with claim 1, wherein the degree of importance of the extracted categories is determined on the basis of the number of identified registered keywords associated with each extracted category.

4. A method in accordance with claim 1, wherein the degree of importance of an extracted category is determined on the basis of the number of identified registered keywords associated with the category that are identified registered keywords associated with another category.

5. A computer program product for categorizing keywords, the computer program product comprising:
one or more computer-readable storage devices and program instructions stored on the one or more computer-readable storage devices, the program instructions comprising:
program instructions to receive, based on user input to a keyboard connected to a computer, a keyword to be categorized;
program instructions to receive, from a storage device communicatively coupled to the computer, a medical category dictionary including categories having associated respective pluralities of registered keywords;
program instructions to receive, from the storage device communicatively coupled to the computer, a text corpus comprising medical texts;
program instructions to identify one or more registered keywords in the medical category dictionary having a degree of similarity to the keyword to be categorized that is equal to or greater than a predetermined value, and to extract the categories associated with the identified registered keywords;
program instructions to identify one or more registered keywords co-occurring in the text corpus with the keyword to be categorized, and to extract the categories associated with the identified co-occurring registered keywords;
program instructions to determine a degree of importance of each extracted category based on a function of the identified registered keywords in the category dictionary and a function of the identified co-occurring registered keywords; and
program instructions to output, to a display screen communicatively coupled to the computer, the extracted categories, with at least an indication of each category's relative importance, as category candidates for categorizing the keyword to be categorized, wherein the display screen presents a table comprising a respective row for respective categories from the category dictionary, a respective column for respective registered keywords, and a respective indication of a search method associated with respective registered keywords.

6. A computer program product in accordance with claim 5, wherein the degree of similarity is determined on the basis of the number of insertion, deletion, and/or substitution edits required to be performed on the keyword to be categorized for the resulting edited word to match a registered keyword.

7. A computer program product in accordance with claim 5, wherein the degree of importance of the extracted categories is determined on the basis of the number of identified registered keywords associated with each extracted category.

8. A computer program product in accordance with claim 5, wherein the degree of importance of an extracted category is determined on the basis of the number of identified registered keywords associated with the category that are identified registered keywords associated with another category.

9. A computer system for categorizing keywords, the computer system comprising:
one or more computer processors, one or more computer-readable storage devices, and program instructions stored on one or more of the computer-readable storage devices for execution by at least one of the one or more processors, the program instructions comprising:
program instructions to receive, based on user input to a keyboard connected to the computer system, a keyword to be categorized;
program instructions to receive, from the one or more computer readable storage devices, a medical category dictionary including categories having associated respective pluralities of registered keywords;
program instructions to receive, from the one or more computer readable storage devices, a text corpus comprising medical texts;
program instructions to identify one or more registered keywords in the medical category dictionary having a degree of similarity to the keyword to be categorized that is equal to or greater than a predetermined value, and to extract the categories associated with the identified registered keywords;
program instructions to identify one or more registered keywords co-occurring in the text corpus with the keyword to be categorized, and to extract the categories associated with the identified co-occurring registered keywords;
program instructions to determine a degree of importance of each extracted category based on a function of the identified registered keywords in the category dictionary and a function of the identified co-occurring registered keywords; and
program instructions to output, to a display screen communicatively coupled to the computer system, the extracted categories, with at least an indication of each category's relative importance, as category candidates for categorizing the keyword to be categorized, wherein the display screen presents a table comprising a respective row for respective categories from the category dictionary, a respective column for respective registered keywords, and a respective indication of a search method associated with respective registered keywords.

10. A computer system in accordance with claim 9, wherein the degree of similarity is determined on the basis of the number of insertion, deletion, and/or substitution edits required to be performed on the keyword to be categorized for the resulting edited word to match a registered keyword.

11. A computer system in accordance with claim 9, wherein the degree of importance of the extracted categories is determined on the basis of the number of identified registered keywords associated with each extracted category.

12. A computer system in accordance with claim 9, wherein the degree of importance of an extracted category is determined on the basis of the number of identified registered keywords associated with the category that are identified registered keywords associated with another category.

13. A computer system in accordance with claim 9, wherein the degree of similarity comprises an inverse of a number of insertion, deletion, and substitution edits required to be performed on the keyword to be categorized for the resulting edited keyword to be categorized to match a registered keyword.

\* \* \* \* \*